(12) United States Patent
Reid et al.

(10) Patent No.: US 9,517,751 B2
(45) Date of Patent: Dec. 13, 2016

(54) MECHANISM FOR DYNAMICALLY VARYING BLADE LOAD OVER A WINDSHIELD WIPER SWEEP CYCLE

(71) Applicant: Rosemount Aerospace Inc., Burnsville, MN (US)

(72) Inventors: Alexander N Reid, St. Louis Park, MN (US); Matthew Webb, Lakeville, MN (US)

(73) Assignee: Rosemount Aerospace, Burnsville, MN (US)

( * ) Notice: Subject to any disclaimer, the term of this patent is extended or adjusted under 35 U.S.C. 154(b) by 120 days.

(21) Appl. No.: 14/332,601

(22) Filed: Jul. 16, 2014

(65) Prior Publication Data

US 2015/0336540 A1    Nov. 26, 2015

Related U.S. Application Data

(60) Provisional application No. 62/002,458, filed on May 23, 2014.

(51) Int. Cl.
*B60S 1/34* (2006.01)

(52) U.S. Cl.
CPC ........... *B60S 1/34* (2013.01); *B60S 1/3411* (2013.01); *B60S 1/3468* (2013.01); *Y10T 29/49828* (2015.01)

(58) Field of Classification Search
CPC ....... B60S 1/3411; B60S 1/3413; B60S 1/345; B60S 1/34; B60S 1/3468; Y10T 29/49828
USPC ....... 15/250.202, 250.203, 250.351, 250.352
See application file for complete search history.

(56) References Cited

U.S. PATENT DOCUMENTS

| 4,993,102 A | * | 2/1991 | Honda | B60S 1/245 |
| | | | | 15/250.13 |
| 5,426,815 A | * | 6/1995 | DaDeppo | B60S 1/3411 |
| | | | | 15/250.202 |
| 5,577,292 A | * | 11/1996 | Blachetta | B60S 1/3411 |
| | | | | 15/250.202 |

FOREIGN PATENT DOCUMENTS

| DE | 4232334 A1 | 3/1994 |
| FR | 2717136 A1 | 9/1995 |
| FR | 2739075 A1 | 3/1997 |
| JP | 557138450 A | 8/1982 |

OTHER PUBLICATIONS

European Patent Office, The extended European search report, Oct. 26, 2015, 5 pages.

* cited by examiner

*Primary Examiner* — Gary Graham
(74) *Attorney, Agent, or Firm* — Kinney & Lange, P.A.

(57) ABSTRACT

A wiper arm assembly has a load member, a wiper arm, and a blade load cam with a cam slot. The load member mates with a joint disposed between first and second ends of the wiper arm. Changes in length of the load member impose a force in a lengthwise direction of the load member. The wiper arm is configured to rotate relative to the blade load cam about an axis proximate to the first end of the wiper arm. The cam slot is configured to vary the length of the load member as a function of a wiper angle in which the wiper angle is defined as the angle between the wiper arm and a starting position of the wiper arm.

19 Claims, 8 Drawing Sheets

MECHANISM FOR DYNAMICALLY VARYING BLADE LOAD OVER A WINDSHIELD WIPER SWEEP CYCLE

RELATED APPLICATION

This application claims priority from U.S. Provisional Application Ser. No. 62/002,458 filed on May 23, 2014.

BACKGROUND

The present invention relates generally to windshield wiper systems, and more particularly, to windshield wipers systems used on high-curvature windshields.

A windshield wiper system is responsible for clearing rain, snow, and other debris from a vehicle windshield, typically by movement of a rubber blade element across the windshield surface. Windshield wiper arms used in the automotive and aerospace industries generally apply a fixed blade load, which is set at the factory or during the installation of the wiper system on the vehicle. The method for applying this blade load can vary. For example, tension spring mechanisms, compression spring mechanisms, flexural cantilever loading, or conical spring washer assemblies are all methods for applying blade load. Although small blade load variation is inevitably caused by the wiper arm rotation that lengthens or shortens the load member as it traverses the wiper cycle, each method is fundamentally similar in that they are not designed to customize blade load as a function of wiper angle. As currently implemented, the connection point nearest to the hub is typically internal to the arm body itself, and there is no secondary attachment point on the drive mechanism. While this design is favorable from an installation and maintenance perspective, its independent nature of design essentially guarantees that the blade load cannot be a function of the angular sweep position.

During operation of a conventional windshield wiper on windshields with high curvature, the wiper arm rotates away from the drive mechanism as it traverses the high-curvature region. The wiper's rotation causes increased blade load and component stress within the wiper system. The additional blade load also increases the friction on the blade as it crosses the high-curvature region of the windshield. The result of increased blade load could be system lock-up, increased rating requirements of drive components, or reduced system reliability. Therefore, a need exists to customize the blade load of a wiper assembly to improve the operation of wiper systems.

SUMMARY

A wiper arm assembly has a load member, a wiper arm, and a blade load cam. The load member has a first end and a second end spaced in a lengthwise direction from the first end. Changes in length of the load member impose a force in a lengthwise direction of the load member. The wiper arm has a first end, a second end opposite the first end, and a joint disposed between the first and second ends. The joint is configured to mate with the load member. The blade load cam has a cam slot and an axis proximate to the first end of the wiper arm. The wiper arm is configured to rotate relative to the blade load cam about the axis. The cam slot is configured to vary the length of the load member as a function of a wiper angle in which the wiper angle is defined as the angle between the wiper arm and a starting position of the wiper arm.

A method of varying the blade load of a wiper arm assembly includes providing a load member, providing a wiper arm, providing a blade, providing a blade load cam, providing a cam follower, and configuring the cam slot to vary the blade load. The load member has a first end and a second end spaced in a lengthwise direction from the first end. Changes in length of the load member impose a force in a lengthwise direction of the load member. The wiper arm has a first end, a second end opposite the first end, and a joint disposed between the first and second ends. The joint is configured to mate with the load member, and the wiper arm is configured to rotate about an axis proximate to the first end. The blade is configured to mate with the second end of the wiper arm. The force transmitted through the load member causes the blade to contact a surface with a blade load. The blade load cam has a cam slot. The cam slot is configured to vary the length of the load member as a function of a wiper angle in which the wiper angle is defined as the angle between the wiper arm and a starting position of the wiper arm. The cam follower mates with the second end of the load member and the cam slot.

DETAILED DESCRIPTION

Figure 1:
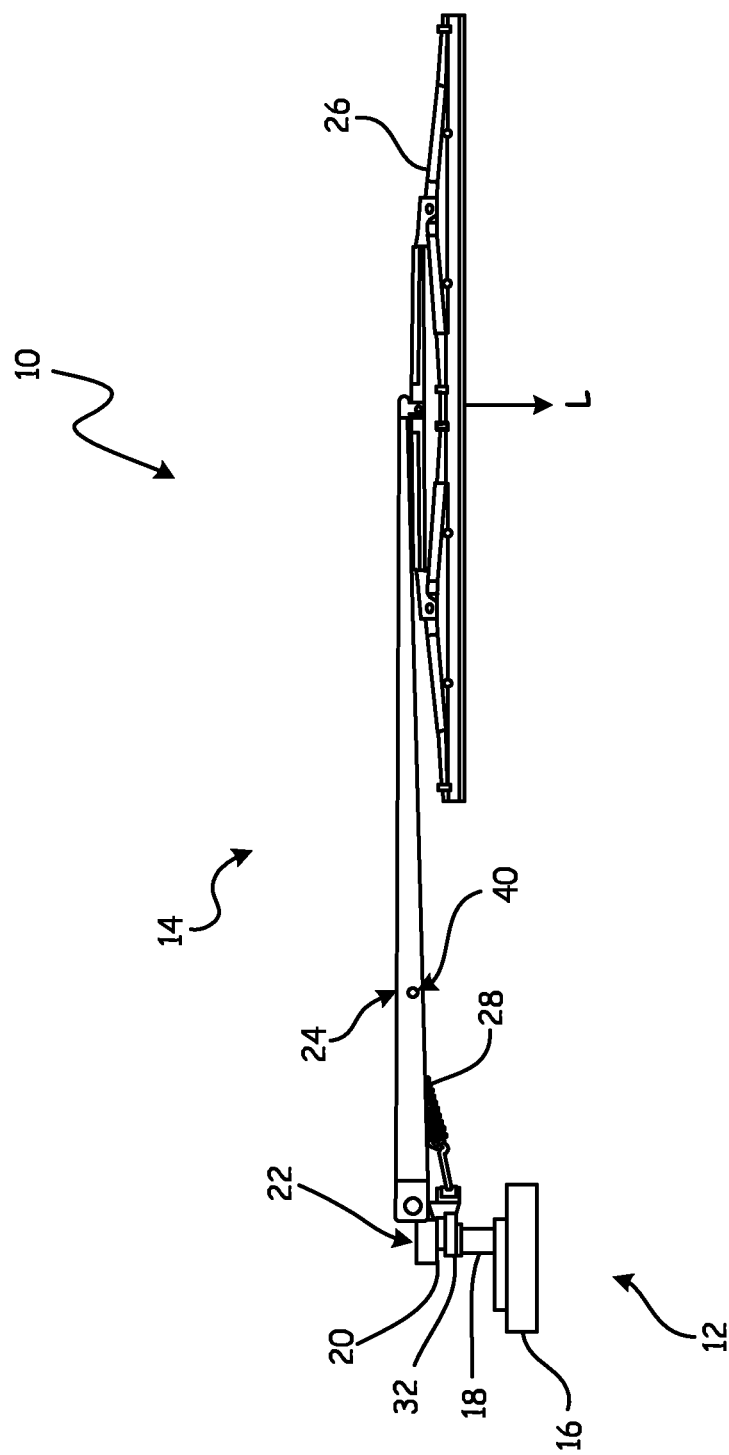
FIG. 1 is a view of a windshield wiper system.

FIG. 1 is a view of windshield wiper system 10. Windshield wiper system 10 includes drive system 12 and wiper arm assembly 14. Drive system 12 further includes a converter 16, an output shaft sleeve 18, and an output shaft 20. Wiper arm assembly 14 further includes arm hub 22, wiper arm 24, blade 26, load member 28, cam follower 30, and blade load cam 32. Windshield wiper system 10 operates to remove water and other debris from a windshield surface by applying blade load L as drive system 12 actuates wiper arm assembly 14 across the windshield surface. Blade load L is the force exerted by blade 26 on the windshield surface (not shown).

Drive system 12 actuates wiper arm assembly 14 through a sweep cycle. A sweep cycle is a windshield operation in which blade 26 traverses from one end of the required vision clearing to the other and back again. Wiper angle is the angle between a starting position of wiper arm 24 and a present position of wiper arm 24 within a sweep cycle. A wiper angle range is a consecutive set of wiper angles within a sweep cycle. Generally, drive system 12 is incorporated into a vehicle such as an aircraft and is not designed to be removable without special tools.

Converter 16 is a component within drive system 12 that translates a rotatory input into an oscillatory motion at output shaft 18. In one embodiment, converter 16 can include a motor and a linkage mechanism arranged such that the rotatory motion from the motor causes the linkage to oscillate. The oscillating end of the linkage is coupled to output shaft 20, causing output shaft 20 to oscillate about its axis. Another embodiment of converter 16 can use a form of electronic actuation to oscillate output shaft 20, for example a stepper motor. Another embodiment of converter 16 can use a form of hydraulic actuation. For example, a linear hydraulic actuator can be coupled to a rack-and-pinion arrangement, in which the linear hydraulic actuator causes the rack to oscillate and the pinion is coupled to output shaft 20, which in turn, oscillates about its axis.

Output shaft 20 drives wiper arm assembly 14 in an oscillatory motion during a sweep cycle. In this embodiment, output shaft 20 is generally cylindrical and is concentric with output shaft sleeve 18.

Output shaft sleeve 18 provides a fixed mounting point for wiper arm assembly 14 that facilitates varying blade load L and protects output shaft 20 from debris and mechanical damage. Output shaft sleeve 18 also provides output shaft 20 with lateral rigidity during normal operation by acting as a guide. Output shaft sleeve 18 is fixed relative to the vehicle structure while output shaft 20 is free to rotate within output shaft sleeve 18. In this embodiment, output shaft sleeve 18 is cylindrical and has a length approximately equal to the length that output shaft 20 is exposed between converter 16 and arm hub 22. The inner diameter of output shaft sleeve 18 is larger than the diameter of output shaft 20 such that output shaft 20 can be inserted concentrically within output shaft sleeve 18. Another embodiment of output shaft sleeve 18 can include a rectangular block or other portion of converter 16 that extends to protect output shaft 20.

Wiper arm assembly 14 is the portion of windshield wiper system 10 that is not incorporated into the vehicle and can be easily removed for maintenance. The configuration of wiper arm assembly 14 applies blade load L to the windshield. Blade load L has a normal component that acts perpendicularly to the windshield surface and a frictional component that acts tangentially to the windshield surface.

Arm hub 22 couples output shaft 20 to wiper arm 24. Arm hub 22 is rigidly affixed to output shaft 20. In this embodiment, arm hub 22 has a cylindrical bore for mating with output shaft 20. To facilitate assembly and disassembly, arm hub 22 has a slot extending radially from the bore to an exterior surface of arm hub 22. For clamping arm hub 22 to output shaft 20, arm hub 22 can include a threaded hole for a fastener, the threaded hole being generally perpendicular to the slot. At the opposing end, arm hub 22 includes another bore for a pin joint that couples arm hub 22 to wiper arm 24. Portions of arm hub 22 that interface with wiper arm 24 are sized such that arm hub 22 can be inserted into wiper arm 24.

Wiper arm 24 is a fixed-length component that couples arm hub 22 to blade 26 and provides a mounting location for load member 28 at joint 40. Wiper arm 24 and blade 26 can be customized to suit the particular windshield application. In this embodiment, wiper arm 24 has a generally straight portion extending from arm hub 22 to blade 26. The mounting location for load member 28 on wiper arm 24 is located closer to arm hub 22 than to blade 26 and can be a cylindrical pin that is affixed to wiper arm 24. The interface between wiper arm 24 and blade 26 can be adapted to suit a particular blade application.

Blade 26 is coupled to wiper arm 24 and holds a rubber blade element that clears the windshield of water or other debris.

Load member 28 couples wiper arm 24 to cam follower 30 and applies a force therebetween. When the length of load member 28 increases or decreases, load member 28 produces a corresponding force along its length. In this embodiment, load member 28 is a tension element, such as a coiled tension spring, and applies a tension force between cam follower 30 and wiper arm 24. The tension force causes wiper arm 24 to rotate towards the windshield surface (not shown) and to press blade 26 into the windshield surface (not shown). The resulting interaction between blade 26 and the windshield surface (not shown) produces the normal component of blade load L. When drive system 12 actuates wiper arm assembly 14, blade 26 traverses the windshield surface (not shown) and because the normal component of blade load L is greater than zero, produces a tangential component to blade load L or frictional force. Persons skilled in the art would appreciate that other load members are also applicable. For example, load member 28 can be configured for flexural cantilever loads, conical spring washer assemblies, compression members, or another conventional method.

Cam follower 30 couples load member 28 to blade load cam 32 and transmits the force produced by load member 28 to blade load cam 32. Cam follower 30 couples to blade load cam 32 at cam slot 36, which permits cam follower 30 to slide within cam slot 36 when drive system 12 actuates wiper arm assembly 14. In this embodiment, cam follower 30 includes two plates that have pins affixed between the plates on opposing ends. The pins of cam follower 30 provide the mounting point for load member 28 on one end and for blade load cam 32 on the opposing end. To further improve the performance of wiper system 10, the pins of cam follower 30 can also be bearings such as a roller bearing to reduce or eliminate sliding contact between cam follower 30 and blade load cam 32.

Blade load cam 32 couples cam follower 30 to output shaft sleeve 18 and transmits the force produced by load member 28 therebetween. Blade load cam 32 includes cam slot 32, and shaft mount 38, and cam slot 36 includes inner face 42 and outer face 44. Blade load cam 32 is affixed to output shaft sleeve 18 such that blade load cam 32 is stationary relative to drive system 12. The geometry of cam slot 36 permits the length of load member 28 to increase or decrease, thereby varying blade load L as a function of wiper angle. The configuration of wiper arm assembly 14 is such that there is a small angle between cam follower 30 and blade load cam 32 to account for the angle between the two mounting points of load member 28. To accommodate this angle, inner face 42 of cam slot 36 is inclined with respect to a centerline axis of shaft mount 38 by acute angle A1. The inclination of inner face 42 is such that angle A1 is substantially constant for radial sections passing through the centerline of shaft mount 38 and intersecting cam slot 36. Outer face 44 is displaced outward from inner face 42 with respect to the centerline of shaft mount 38 such that the distance between the inner face 42 and outer face 44 is generally constant as measured within a radial section passing through the centerline of shaft mount 38. In this embodiment, angle A1 between cam follower 30 and blade load cam 32 is approximately 10 degrees.

Figure 2:
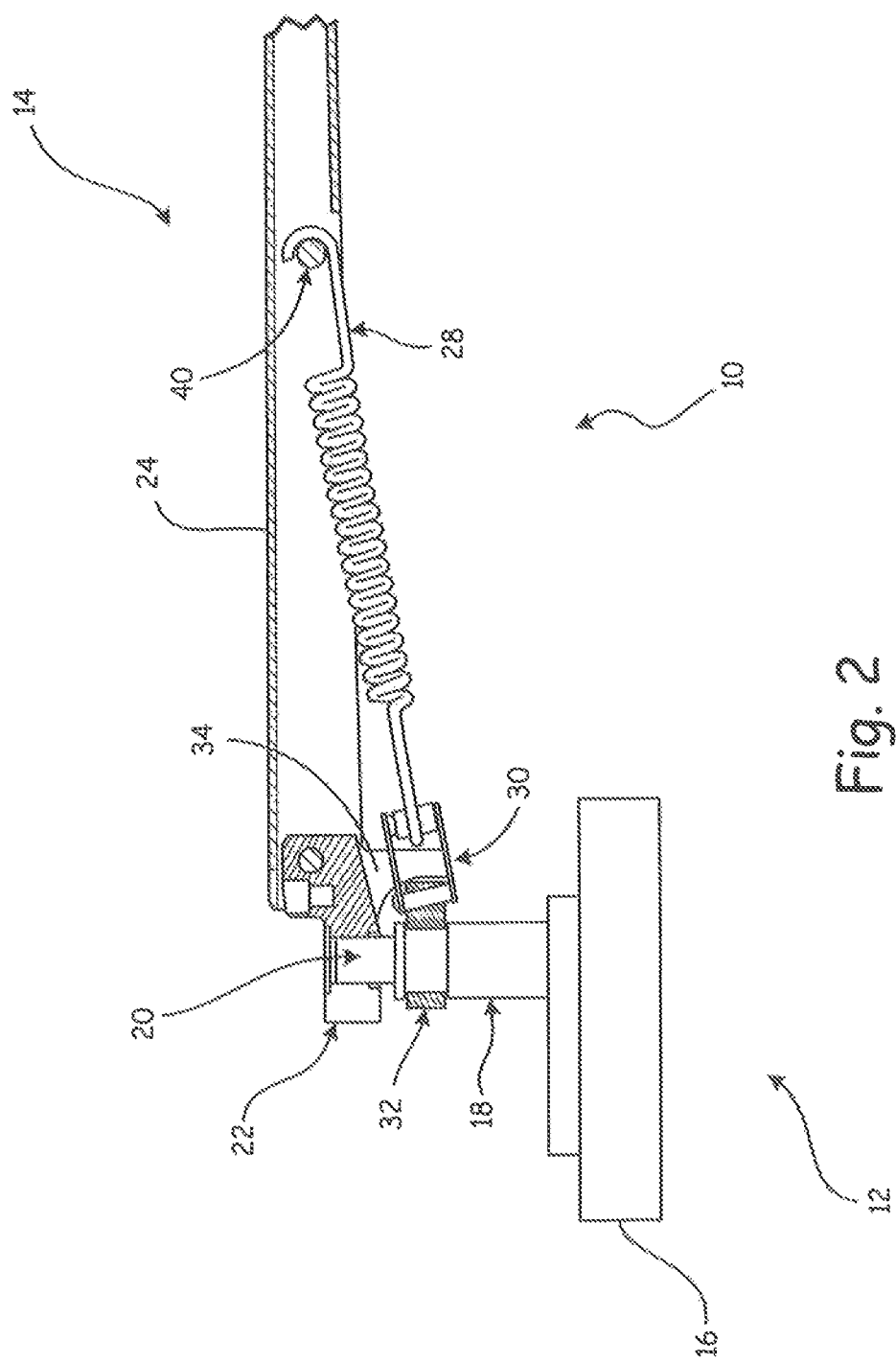
FIG. 2 is an enlarged longitudinal section of the windshield wiper system of FIG. 1.

FIG. 2 is an enlarged longitudinal section of windshield wiper system 10 as depicted in FIG. 1, which further illustrates the relationship between wiper arm 24, load member 28, cam follower 30, blade load cam 32, and output shaft sleeve 18.

Figure 4:
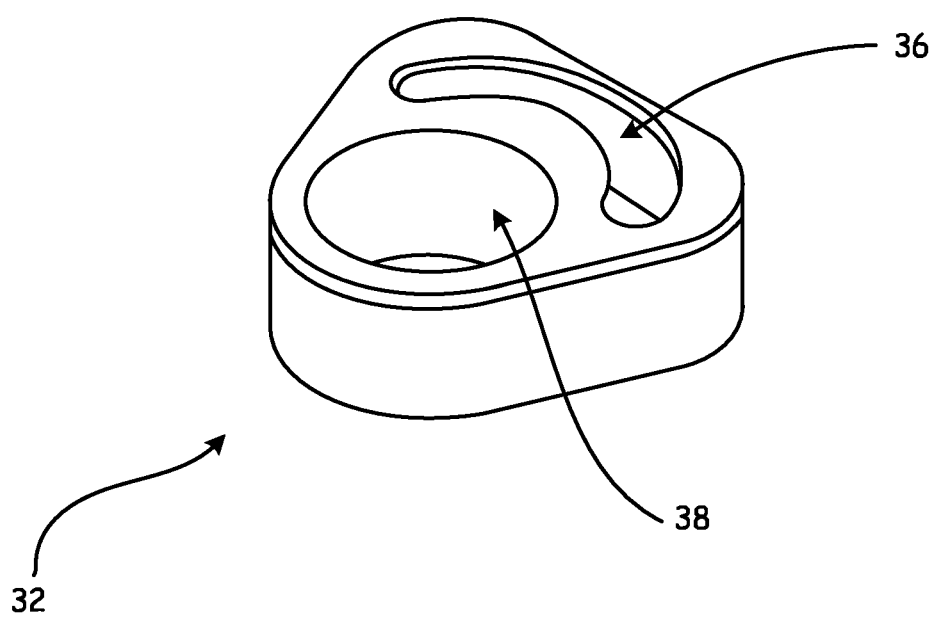
FIG. 4 is a perspective view of a blade load cam.
Figure 5:
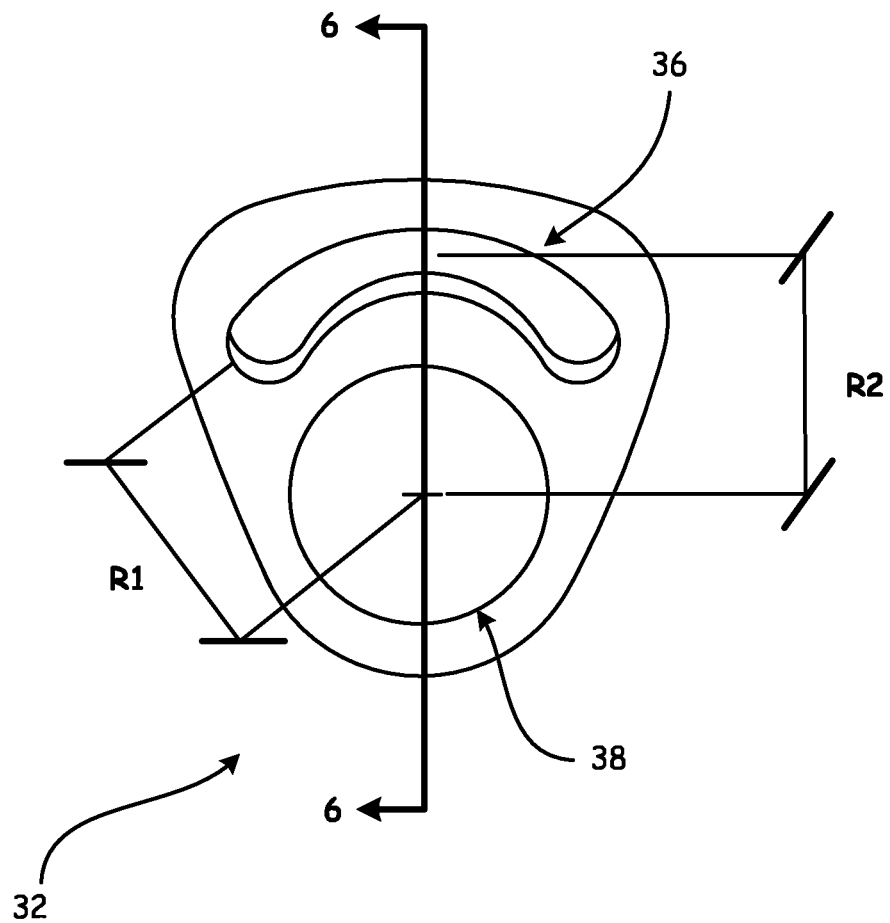
FIG. 5 is a plan view of one embodiment of a blade load cam.
Figure 6:
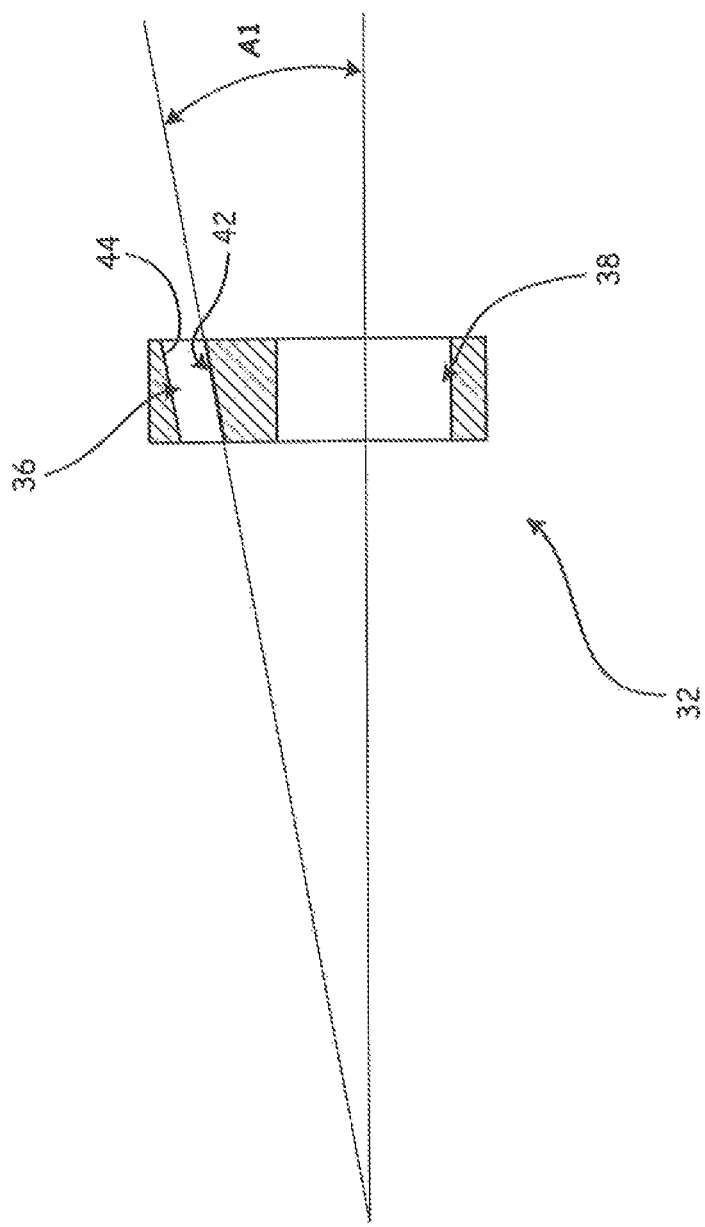
FIG. 6 is a cross-sectional view of the blade load cam of FIG. 5.

Arm hub 22 can further include protrusion 34 for guiding cam follower 30 as it slides within cam slot 36 (see FIGS. 4-6). In this embodiment, protrusion 34 includes two plates that extend from arm hub 22 and straddle cam follower 30. The orientation of protrusion 34 restrains cam follower 30 such that the force from load member 28 remains aligned with the longitudinal axis of wiper arm 24. Maintaining the alignment of cam follower 30 with respect to wiper arm 24 reduces stress in cam follower 30 and blade load cam 32.

Figure 3:
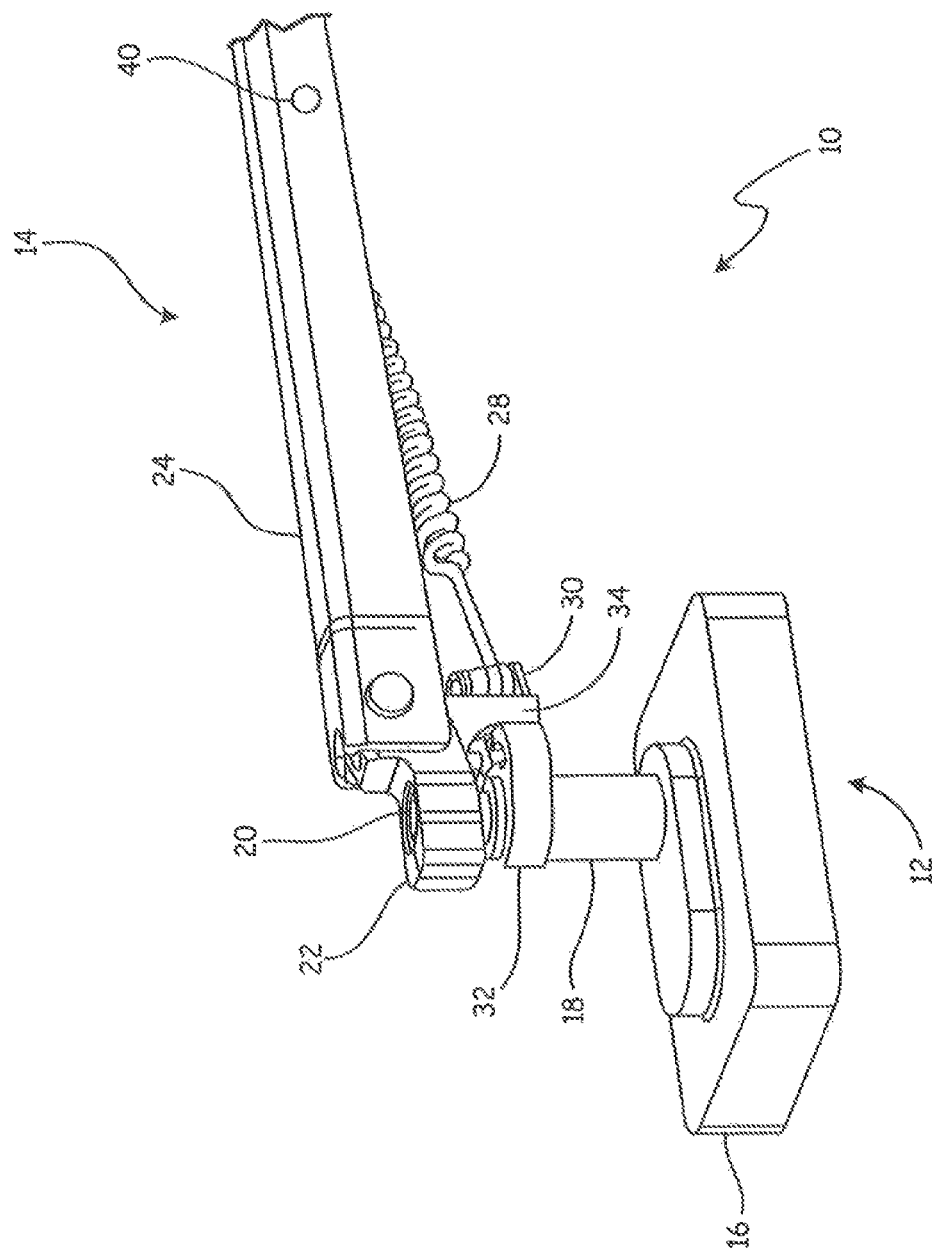
FIG. 3 is an enlarged perspective view of a windshield wiper system.

FIG. 3 is an enlarged perspective view of windshield wiper system 10, which further illustrates windshield wiper system 10.

FIG. 4 is a perspective view of blade load cam 32. FIG. 5 is a plan view of blade load cam 32. FIG. 6 is a section view of the blade load cam 32 of FIGS. 4 and 5. FIGS. 4-6 further illustrate blade load cam 32, cam slot 36, and shaft mount 38.

The geometry of cam slot 36 can be customized to vary blade load L (FIG. 1) as a function of wiper angle. For example, the windshield surface (not shown) may have a region of high curvature. Generally, windshield wiper system 10 is positioned with respect to a windshield surface such that the gradients over which the wiper travels are minimized. Typically, the orientation of windshield wiper system 10 places the region of high curvature near the center of the windshield surface corresponding to a central portion of cam slot 36. When cam slot 36 is designed to accommodate a high-curvature windshield, cam slot 36 can be generally concave, the concave opening facing the centerline of shaft mount 38 as depicted in FIGS. 4-6. Radius R1 (shown in FIG. 5) between the centerline of shaft mount 38 and the center of cam slot 36 is approximately equal to corresponding radius R7 on the opposite side of cam slot 36 while radius R2 near the midpoint of cam slot 36 is generally greater than radius R1 and radius R7 at the ends of cam slot 36. The resulting cam slot 36 reduces the tension spring length near the central portion of cam slot 36 thereby reducing blade load L through areas of high curvature. Similarly, if the region of high curvature was located closer to the start or end of the sweep cycle, cam slot 36 could be adjusted to reduce blade load L in a similar manner.

Figure 7:
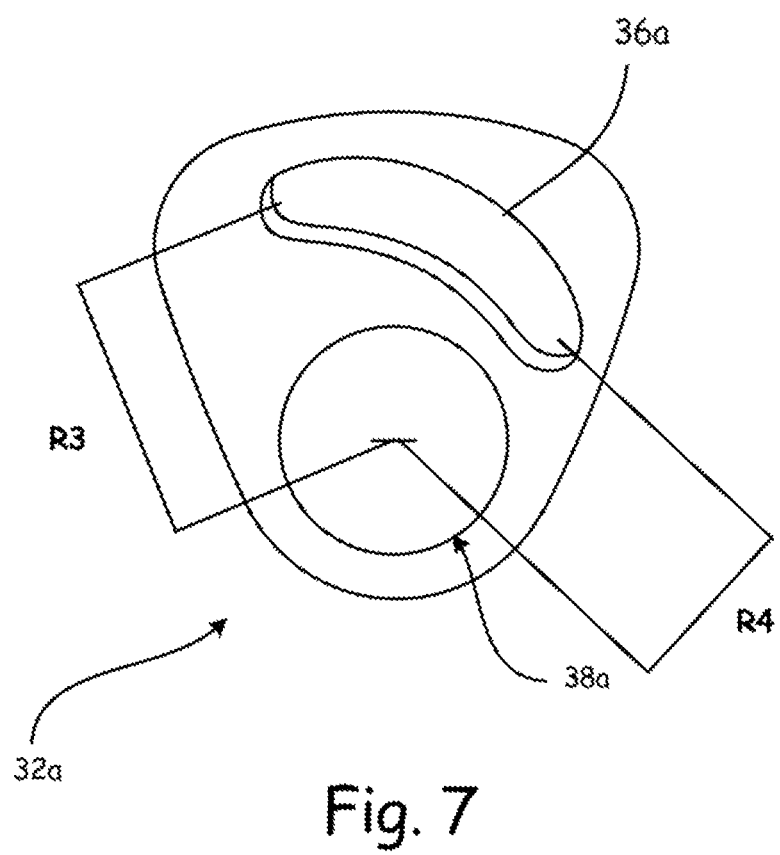
FIG. 7 is a plan view of one embodiment of a blade load cam.

FIG. 7 is a plan view of blade load cam 32a. Blade load cam 32a includes cam slot 36a and shaft mount 38a and is similar to blade load cam 32 except that cam slot 36a has a different geometry. Cam slot 36a may be designed to resist the lifting load on wiper arm assembly 14. Generally blade 26 is orientated vertically or horizontally when parked so that blade arm 24 and blade 26 do not obscure the view of the vehicle operator. When blade 26 is generally parallel with the air flowing over the windshield, the lifting force on wiper arm assembly 14 is lower than when blade 26 is generally perpendicular to the air flow. Cam slot 36a can be customized such that blade load L is proportionate to the lifting force on wiper arm assembly 14 as a function of wiper angle. For example, consider cam slot 36a that is designed for a wiper arm assembly where blade 26 is parked vertically and parallel to the air flow. At the beginning of the sweep cycle, the lift force is low while the lift force is higher at the end of the sweep cycle. In this application, cam slot 36a will have a sloped profile in which radius R3 is greater than radius R4. The sloped profile causes the spring to lengthen as blade 26 approaches the midpoint of the sweep cycle, and thereby increases tension and blade load L as blade 26 traverses from the parked or vertical orientation to the horizontal orientation. Therefore, blade load L will be matched to the lifting force as a function of wiper angle.

Figure 8:
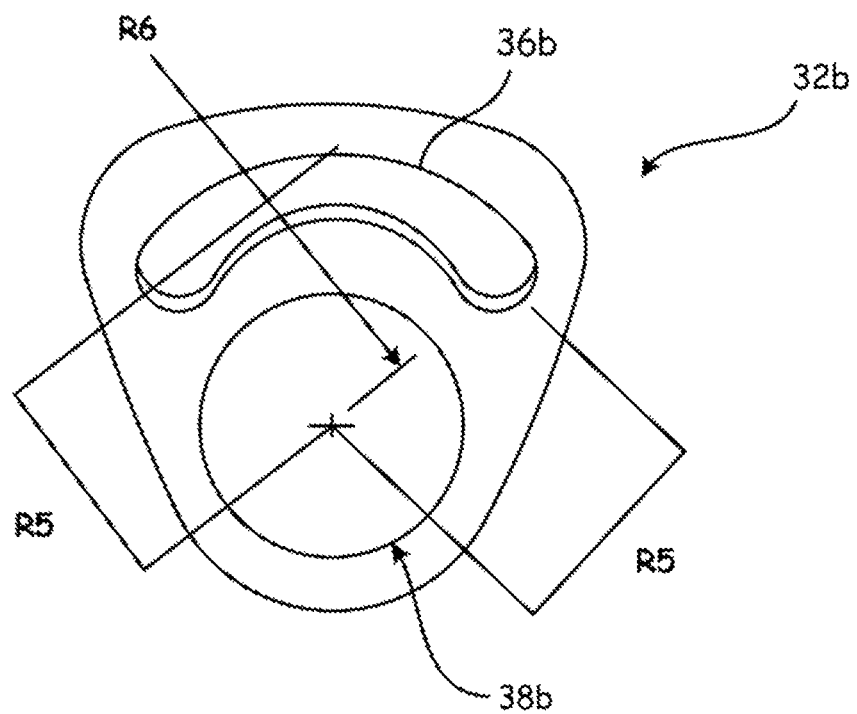
FIG. 8 is a plan view of one embodiment of a blade load cam.

FIG. 8 is a plan view of blade load cam 32b. Blade load cam 32b includes cam slot 36b and shaft mount 38b and is similar to blade load cam 32 except that cam slot 36b has a different geometry. Cam slot 36c can be designed to reduce blade load L when blade 26 traverses a small discontinuity between the windshield surface and the surrounding vehicle structure. For instance, some wiper systems are parked off the windshield such that view of the vehicle operator is completely unobstructed by components of windshield wiper system 10. In this instance, cam slot 36c would have a corresponding region where radius R6 between shaft mount 38b and the center of cam slot 36c is greater than surrounding regions, such as radius R5 located at the end of cam slot 36c. This profile causes a corresponding decrease of blade load L over a wiper angle range near radius R6.

This invention strives to customize the blade load to a particular application by varying the blade load as a function of wiper angle. For example, a reduced blade load is advantageous when the blade traverses a high-curvature region on the windshield or when the blade transitions from the windshield to a parked position. Reducing the blade load is beneficial because it reduces system stress and torque requirements required to drive the blade through the sweep cycle. Reducing the blade load may also result in improved system reliability, reduced motor power required to drive the system, and reduced risk for system lock-up. Alternatively, this invention may also be used to increase the blade load to overcome aerodynamic forces that lift the wiper blade off the windshield surface during operation. Increasing the blade load proportionally with the aerodynamic force on the blade permits an increased blade load when the aerodynamic forces are high while maintaining a reduced blade load when the aerodynamic forces are low. Therefore, average blade load for a given sweep cycle will be reduced, improving system reliability.

Discussion of Embodiments

The following are non-exclusive descriptions of possible embodiments of the present invention.

A wiper arm assembly can have a load member, a wiper arm, and a blade load cam. The load member can have a first end and a second end spaced in a lengthwise direction from the first end where changes in length of the load member impose a force in the lengthwise direction of the load member. The wiper arm can have a first end, and second end opposite the first end, and a joint disposed between the first and second ends. The joint can be configured to mate with the load member. The blade load cam can have a cam slot. The blade load cam can be configured to rotate about an axis proximate to the first end of the wiper arm. The cam slot can be configured to vary the length of the load member as a function of a wiper angle defined as the angle between the wiper arm and a starting position of the wiper arm.

A further embodiment of the foregoing wiper arm assembly can optionally include, additionally and/or alternatively, any one or more of the following features, configurations, and/or additional components:

A further embodiment of any of the foregoing wiper arm assemblies can have a curved cam slot that is generally concave toward the axis of the blade load cam.

A further embodiment of any of the foregoing wiper arm assemblies can have a cam slot that has an inner face. The inner face of the cam slot can be inclined with respect to the axis of the blade load cam such that a radial section passing through the axis of the blade load cam and intersecting the cam slot defines an acute angle between an intersected edge of the inner face and the axis of the blade load cam.

A further embodiment of any of the foregoing wiper arm assemblies can have the second end of the wiper arm configured to connect to a blade that contacts a surface. The wiper arm assembly can be configured such that the load member causes the blade to impose a blade load on the surface.

A further embodiment of any of the foregoing wiper arm assemblies can have a radially outward portion of the cam slot with respect to the axis of the blade load cam corresponding to a wiper angle range through which the blade traverses a discontinuity on the surface.

A further embodiment of any of the foregoing wiper arm assemblies can also include an arm hub and a cam follower. The arm hub can be configured to mate with an output shaft of an actuator. The arm hub can be configured to mate with the wiper arm at a pin attachment end. The cam follower can mate with the second end of the load member and the cam slot.

A further embodiment of any of the foregoing wiper arm assemblies can have a cam follower that is substantially co-linear with the load member.

A further embodiment of any of the foregoing wiper arm assemblies can have an arm hub that also includes a first protrusion and a second protrusion. The second protrusion can be offset from the first protrusion. The first and second protrusions can restrain the cam follower such that the cam follower is co-planar with a plane defined by the axis of the blade load cam and the joint of the wiper arm.

A further embodiment of any of the foregoing wiper arm assemblies can also include a converter, an output sleeve, and an output shaft. The converter can be enclosed within a housing, and the converter can transform a rotary input into an oscillatory output. The output sleeve can be defined by a cylindrical structure extending from the housing. The blade load cam can be affixed to the output sleeve. The output shaft can be disposed concentrically with the output sleeve. The output shaft can mate with the arm hub, and the output shaft can transmit the oscillatory output of the converter to the arm hub.

A method for varying the blade load of a wiper arm assembly can include providing a load member, providing a wiper arm, providing a blade, providing a blade load cam, providing a cam follower, and configuring the cam slot. The load member can have a first end and a second end spaced in a lengthwise direction from the first end where changes in length of the load member impose a force in the lengthwise direction of the load member. The wiper arm can have a first end, and second end opposite the first end, and a joint disposed between the first and second ends. The joint can be configured to mate with the load member. The blade can be configured to mate with the second end of the wiper arm, and the load member can be configured such that the force transmitted through it causes the blade to contact the surface. The blade load cam can have a cam slot. The blade load cam can be configured to rotate about an axis proximate to the first end of the wiper arm. The cam slot can be configured to vary the length of the load member as a function of a wiper angle defined as the angle between the wiper arm and a starting position of the wiper arm. The cam follower can mate with the second end of the load member and the cam slot. The cam slot can be configured to vary the blade load.

A further embodiment of the foregoing method can optionally include, additionally and/or alternatively, any one or more of the following features, configurations, and/or additional components:

A further embodiment of any of the foregoing methods can have a cam slot configured to reduce the blade load of a wiper angle range through which the blade traverses a discontinuity in the surface.

A further embodiment of any of the foregoing methods can have a cam slot configured to increase the blade load or a wiper angle range through which aerodynamic forces on the wiper blade tend to decrease the blade load.

A further embodiment of any of the foregoing methods can also include actuating the wiper arm assembly such that the wiper arm and the blade oscillate about the axis proximate to the first end of the wiper arm.

The invention claimed is:

1. A wiper arm assembly comprising:
   a load member having a first end and a second end spaced in a lengthwise direction from the first end, wherein changes in length of the load member impose a force in the lengthwise direction of the load member;
   a wiper arm having a first end, a second end opposite the first end, and a joint disposed between the first and second ends, wherein the joint is configured to mate with the load member; and
   a blade load cam having a cam slot and an axis proximate to the first end of the wiper arm, wherein the wiper arm is configured to rotate relative to the blade load cam about the axis, and wherein the cam slot is configured to vary the length of the load member as a function of a wiper angle defined as the angle between the wiper arm and a starting position of the wiper arm;
   wherein the cam slot comprises:
     an inner face inclined with respect to the axis of the blade load cam such that an acute angle is formed between the inner face and the axis of the blade load cam in a radial cross section passing through the axis of the blade load cam and intersecting the cam slot.

2. The wiper arm assembly of claim 1, wherein the cam slot has a curved path that is generally concave toward the axis of the blade load cam.

3. The wiper arm assembly of claim 1, wherein the second end of the wiper arm connects to a blade that contacts a surface, and wherein the wiper arm assembly is configured such that the load member causes the blade to impose a blade load on the surface.

4. The wiper arm assembly of claim 3, wherein a radially outward portion of the cam slot with respect to the axis of the blade load cam corresponds to a wiper angle range through which the blade traverses a discontinuity on the surface.

5. The wiper arm assembly of claim 1, further comprising:
   an arm hub configured to mate with an output shaft of an actuator, wherein the arm hub mates with the wiper arm at a pin attachment; and
   a cam follower that mates with the second end of the load member and the cam slot.

6. The wiper arm assembly of claim 5, wherein the cam follower is substantially co-linear with the load member.

7. The wiper arm assembly of claim 5, the arm hub further comprising:
   a first protrusion, and
   a second protrusion offset from the first protrusion, wherein the first and second protrusion restrain the cam follower such that the cam follower is co-planar with a plane defined by the axis of the blade load cam and the joint of the wiper arm.

8. The wiper arm assembly of claim 5, further comprising:
   a converter enclosed within a housing, wherein the converter transforms a rotary input into an oscillatory output;
   an output sleeve defined by a cylindrical structure extending from the housing, wherein the blade load cam is affixed to the output sleeve; and an output shaft disposed concentrically within the output sleeve; wherein the output shaft mates with the arm hub, and wherein the output shaft transmits the oscillatory output of the converter to the arm hub.

9. The wiper arm assembly of claim 1, wherein the cam slot is defined by a first radius corresponding to the starting position of the wiper arm, a second radius corresponding an extending position of the wiper arm, and a third radius between the first and second radii along the cam slot, each radius being defined between the axis and the cam slot, and wherein the third radius is greater than the first and second radii.

10. The wiper arm assembly of claim 9, wherein the second end of the wiper arm connects to a blade that contacts a surface, and wherein the third radius corresponds to a region of high curvature of the surface.

11. The wiper assembly of claim 9, wherein the second end of the wiper arm connects to a blade that contacts a surface, and wherein the third radius corresponds to a boundary of the surface where the blade traverses from the surface to an adjacent surface.

12. The wiper assembly of claim 1, wherein the cam slot is defined by a first radius corresponding to the starting position of the wiper arm in which the wiper arm is orientated substantially parallel to a direction of air flow local to the wiper arm and a second radius corresponding an extended position of the wiper arm, each radius being defined between the axis and the cam slot, and wherein the second radius is greater than the first radius such that the load member lengthens as the wiper arm transverses from the starting position to the extended position.

13. A method of varying a blade load of a wiper arm assembly, the method comprising:
providing a load member having a first end and a second end spaced in a lengthwise direction from the first end, wherein changes in length of the load member impose a force in the lengthwise direction of the load member;
providing a wiper arm having a first end, a second end opposite the first end, and a joint disposed between the first and second ends, wherein the joint is configured to mate with the load member;
providing a blade configured to mate with the second end of the wiper arm, wherein the force transmitted through the load member causes the blade to contact a surface with a blade load;
providing a blade load cam having a cam slot and an axis proximate to the first end of the wiper arm, wherein the wiper arm is configured to rotate relative to the blade load cam about the axis;
configuring the cam slot to vary the length of the load member as a function of a wiper angle defined as the angle between the wiper arm and a starting position of the wiper arm, wherein the cam slot has an inner face inclined with respect to the axis of the blade load cam such that an acute angle is formed between the inner face and the axis of the blade load cam in a radial cross section passing through the axis of the blade load cam and intersecting the cam slot;
providing a cam follower that mates with the second end of the load member and the cam slot;
configuring the cam slot to vary the blade load; and
actuating the wiper arm assembly such that the wiper arm and the blade oscillate about the axis proximate to the first end of the wiper arm, wherein the blade load varies via the cam slot changing the length of the load member.

14. The method of claim 13, wherein the cam slot is configured to reduce the blade load of a wiper angle range through which the blade traverses a discontinuity in the surface.

15. The method of claim 13, wherein the cam slot is configured to increase the blade load of a wiper angle range through which aerodynamic forces on the wiper blade tend to decrease the blade load.

16. A wiper arm assembly comprising:
a load member having a first end and a second end spaced in a lengthwise direction from the first end, wherein changes in length of the load member impose a force in the lengthwise direction of the load member;
a wiper arm having a first end, a second end opposite the first end, and a joint disposed between the first and second ends, wherein the joint is configured to mate with the load member;
a blade load cam having a cam slot and an axis proximate to the first end of the wiper arm, wherein the wiper arm is configured to rotate relative to the blade load cam about the axis, and wherein the cam slot is configured to vary the length of the load member as a function of a wiper angle defined as the angle between the wiper arm and a starting position of the wiper arm;
an arm hub configured to mate with an output shaft of an actuator, wherein the arm hub mates with the wiper arm at a pin attachment;
a cam follower that mates with the second end of the load member and the cam slot;
a converter enclosed within a housing, wherein the converter transforms a rotatory input into an oscillatory output;
an output sleeve defined by a cylindrical structure extending from the housing, wherein the blade load cam is affixed to the output sleeve; and
an output shaft disposed concentrically within the output sleeve, wherein the output shaft mates with the arm hub, and wherein the output shaft transmits the oscillatory output of the converter to the arm hub.

17. The wiper arm assembly of claim 16, the arm hub further comprising:
a first protrusion, and
a second protrusion offset from the first protrusion, wherein the first and second protrusions restrain the cam follower such that the cam follower is co-planar with a plane defined by the axis of the blade load cam and the joint of the wiper arm.

18. The wiper arm assembly of claim 16, wherein the second end of the wiper arm connects to a blade that contacts a surface, and wherein a radially outward portion of the cam slot with respect to the axis of the blade load cam corresponds to a wiper angle range through which the blade traverses a discontinuity on the surface.

19. The wiper arm assembly of claim 16, wherein the cam slot has a curved path that is generally concave toward the axis of the blade load cam.

* * * * *